Patented Nov. 16, 1943

2,334,508

UNITED STATES PATENT OFFICE 2,334,508

WIPER FOR WINDSCREENS OR OTHER WINDOWS

Robert Hesketh Purden, Birmingham, England, assignor to Joseph Lucas Limited, Birmingham, England Application August 28, 1942, Serial No. 456,551
In Great Britain October 6, 1941

2 Claims. (Cl. 15—250)

This invention relates to wipers of the rotary arm type used for cleaning the wind screens or other windows of air or water craft, or land vehicles, and has for its object to provide an improved wiper whereby obstruction to vision is reduced to a minimum.

The invention comprises the combination of a rotary annular member, a housing for the said member, and a wiper arm pivotally attached to the said member and adapted to extend radially across the region bounded by the said member, and means for automatically moving the arm into and out of its operative position.

In the accompanying sheets of explanatory drawings—

Figure 1:
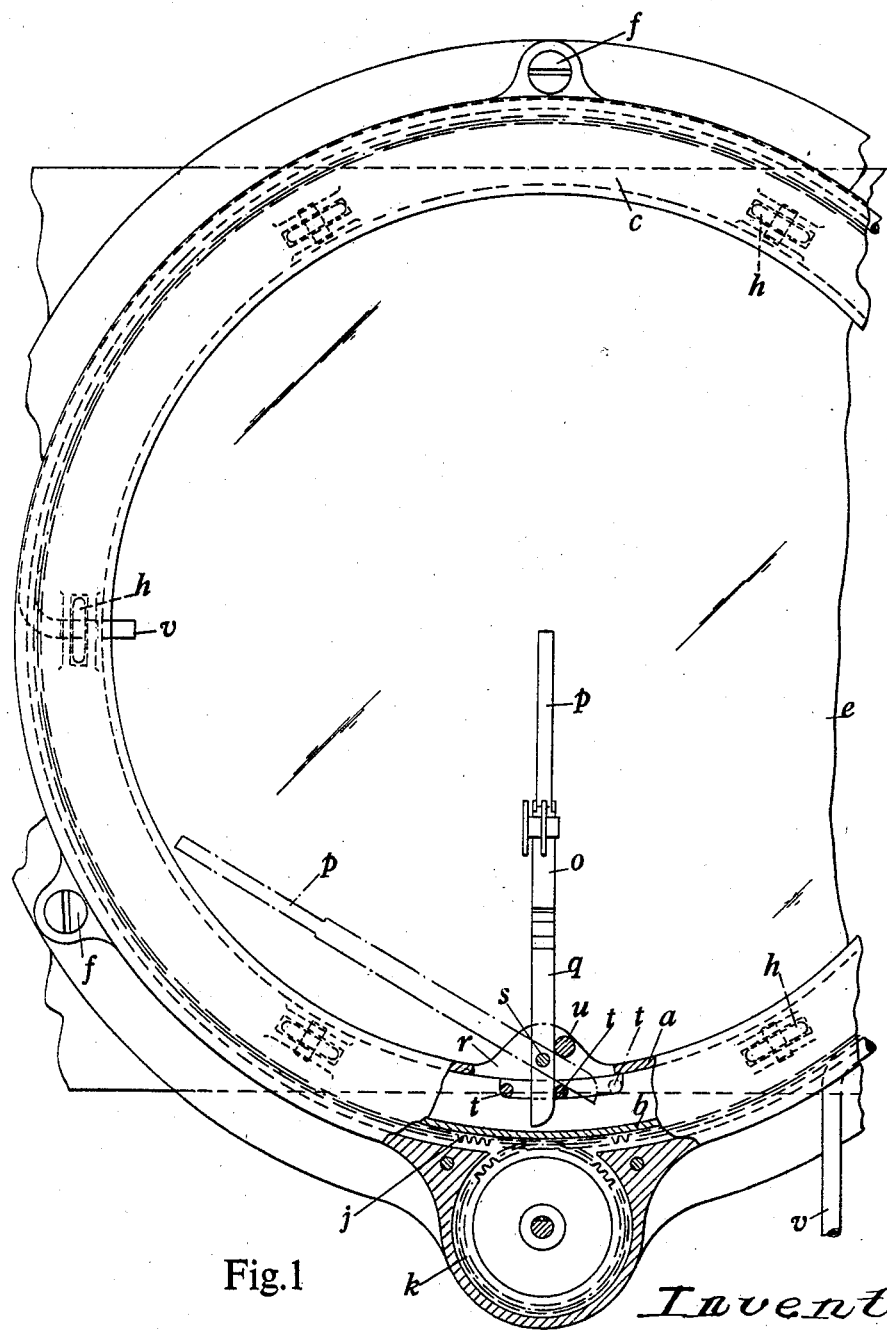
Figure 2:
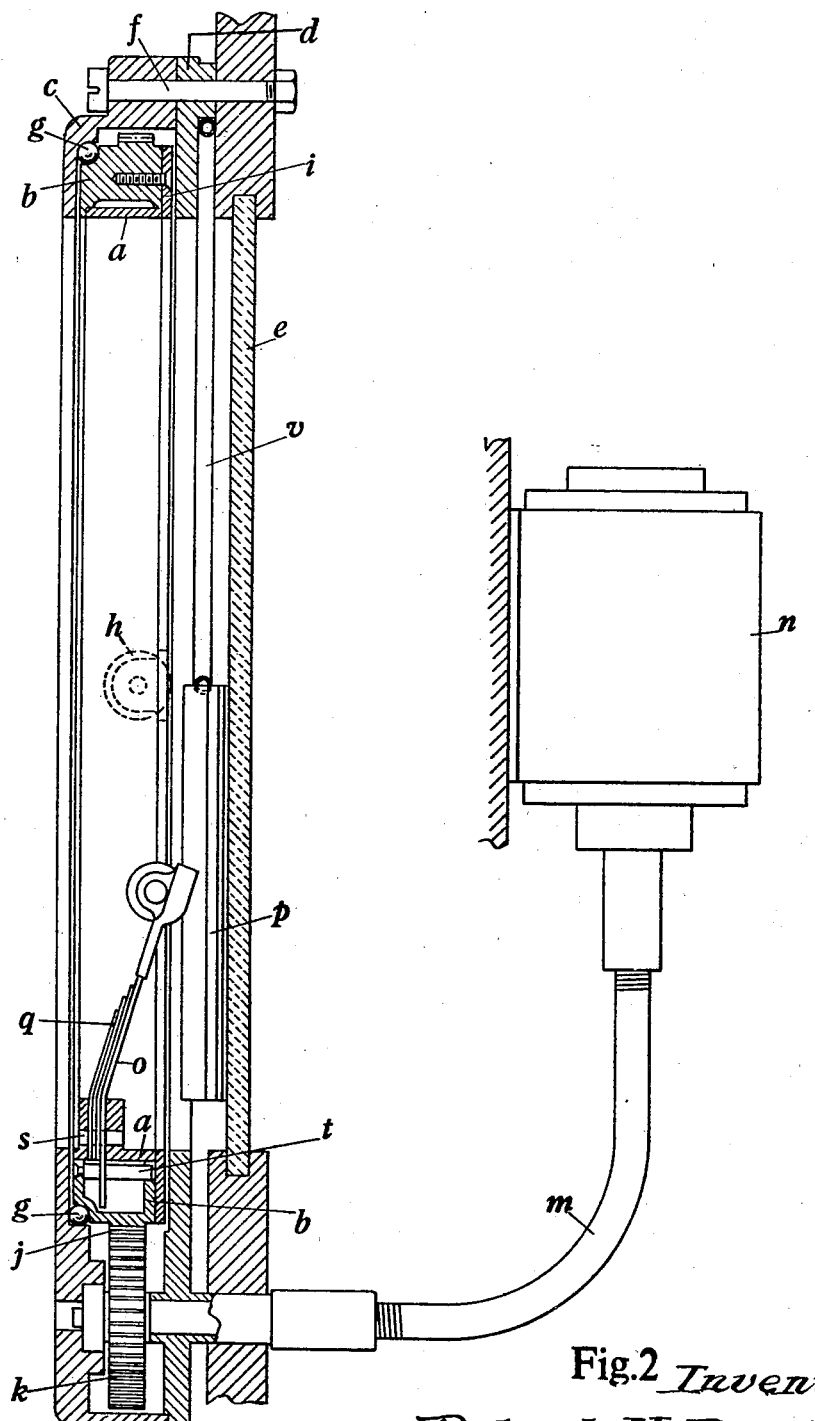

Figure 1 is a part sectional front elevation, and Figure 2 a sectional side elevation of a wind screen wiper constructed in accordance with the invention.

In carrying the invention into effect as shown, I employ a hollow annular member composed of a pair of concentrically arranged (inner and outer) rings $a$, $b$, of any convenient diameters and cross sections, the two rings being connected together in the manner hereinafter described. The annular member $a$, $b$, is rotatably mounted in a housing composed of a pair of coaxially arranged parts $c$, $d$, which are adapted to be secured together, and in a position closely adjacent to the outer surface of a wind screen or window $e$, by bolts $f$ passing through the two parts of the housing and the window frame. To minimise friction the annular member $a$, $b$, is supported in the housing $c$, $d$, by a ring of bearing balls $g$ and rollers $h$, the latter being mounted on a third ring $i$ which is secured to the rear side of the outer ring $b$, and which serves to prevent relative axial movement of the inner and outer rings. The annular member $a$, $b$ is adapted to be rotated in any convenient manner. Thus, the outer periphery of the outer ring $b$ may be formed with gear teeth $j$ with which engages a pinion $k$ driven through a flexible or other connection $m$, by an electric motor $n$ or any other source of motion. Alternatively the outer periphery of the outer ring may form part of a friction gear driven by the motor or other source of motion. Or the annular member may be adapted to be driven by a belt or chain.

To a point on the inner ring $a$ there is attached one end of an arm $o$ carrying a wiper blade $p$, the arm being arranged to extend radially inwards to the centre of the ring.

When the annular member $a$, $b$, is rotated the blade $p$ sweeps over the whole or the greater part of the area of the window $e$ enclosed by said member, and in so doing wipes off any obscuring matter such as water, mist, snow or mud.

Preferably and as shown the arm $o$ is flexible in a plane at right angles to the window $e$. Alternatively the arm may be capable of pivotal movement in the said plane. In either of these cases the wiper blade $p$ is held in contact with the window $e$ by a spring as $q$ acting on the arm $o$.

The outer end of the arm $o$ extends through a slot $r$ in the inner ring $a$, and is connected to this ring by a pivot $s$ which enables the arm to be swung in the plane of the ring between a radial operative position (as shown in full lines in Figure 1) and a chordal or tangential parking position (as shown in chain-dotted lines in Figure 1). Also I provide any convenient lost-motion connection between the two rings $a$, $b$, and arrange that relative motion of these rings causes the arm $o$ to be swung from one of its limit positions to the other. This lost-motion connection may consist as shown of a pair of spaced abutments $t$ in the form of transverse pins on the outer ring $b$, and another abutment $u$ in the form of a transversely arranged pin on an adjacent part of the inner ring $a$, the inner end of the arm being arranged to extend between the first mentioned stops.

Assuming the annular member $a$, $b$ to be at rest with the arm $o$ in the parked position, the first effect of imparting clock-wise motion to the outer ring $b$ is to cause the latter to move relatively to the inner ring $a$ and so cause one of the abutments $t$ to swing the arm to its radial position where it bears against the stop $u$. Subsequently the two rings $a$, $b$, move together causing the wiper blade $p$ to sweep over the window $e$ as above described. On stopping the annular member $a$, $b$, a momentary reversed motion is given to the outer ring $b$ to cause the arm to be returned by the other stop $t$ to the parked position.

In cases where the wiper above described is to be used for wiping the wind screen of an aircraft, any convenient means may be combined with the housing $c$, $d$, for supplying de-icing liquid to the wind screen. In the example shown such means comprises a tube $v$ situated within an annular recess in the rear of the housing part $d$, and having a radially inturned delivery end.

By this invention I am able to effect the rotation of a rotary wiper arm in a very simple and convenient manner and without obstruction of the area of vision by the driving mechanism. Also by the provision of parking means such as that above described the wiper arm can be conveniently moved to a position in which it offers a minimum of obstruction to vision when not in use.

The invention is not, however, limited to the example above described as subordinate constructional details may be varied to suit different requirements.

Having thus described my invention what I claim as new and desire to secure by Letters Patent is:

1. A wind screen or other window wiper of the type specified, comprising the combination of a rotary annular member, a housing for the said member, a wiper arm pivoted to the said member and adapted to extend radially across the region bounded by the said member, and means for automatically moving the arm into and out of its operative position.

2. A wind screen or other window wiper as claimed in claim 1, in which the rotary annular member to which the wiper arm is pivoted comprises a pair of concentrically arranged rings having between them a lost-motion connection formed in part by an adjacent end of the wiper arm, the arrangement being such that relative movement of the rings causes the arm to be swung into or out of its operative position.

ROBERT HESKETH PURDEN.